US011181392B2

(12) United States Patent
Shen

(10) Patent No.: US 11,181,392 B2
(45) Date of Patent: Nov. 23, 2021

(54) AUTOMATIC METER READING SYSTEM

(71) Applicant: Spire Metering Technology LLC, Marlborough, MA (US)

(72) Inventor: Chang Shen, Acton, MA (US)

(73) Assignee: SPIRE METERING TECHNOLOGY LLC, Marlborough, MA (US)

( * ) Notice: Subject to any disclaimer, the term of this patent is extended or adjusted under 35 U.S.C. 154(b) by 0 days.

(21) Appl. No.: 16/941,996

(22) Filed: Jul. 29, 2020

(65) Prior Publication Data
US 2021/0033423 A1 Feb. 4, 2021

Related U.S. Application Data

(60) Provisional application No. 62/880,139, filed on Jul. 30, 2019.

(51) Int. Cl.
G08B 23/00 (2006.01)
G01D 4/00 (2006.01)
G06Q 50/06 (2012.01)

(52) U.S. Cl.
CPC ............. *G01D 4/002* (2013.01); *G06Q 50/06* (2013.01)

(58) Field of Classification Search
CPC ............ A61F 2220/0016; A61F 2/0077; A61F 2/2412; A61F 2/2433; A61F 2/2445; A61F 2/2466; A61F 2/9517; G01D 4/002; G06Q 50/06; A61B 2017/0464; A61B 2017/0409; A61B 2017/00243; A61B 17/0487; A61B 17/0401

USPC ..................................................... 340/870.02
See application file for complete search history.

(56) References Cited

U.S. PATENT DOCUMENTS

| 9,400,192 | B1* | 7/2016 | Salser, Jr. | ............... G01F 15/18 |
| 2004/0061624 | A1* | 4/2004 | Villicana | .................. H04Q 9/00 340/870.02 |
| 2007/0103335 | A1* | 5/2007 | Fitzgerald | .............. G01D 4/002 340/870.02 |
| 2008/0133065 | A1* | 6/2008 | Cannon | .................... H04L 12/10 700/295 |
| 2008/0180275 | A1* | 7/2008 | Whitaker | ............... G01D 4/008 340/870.03 |
| 2019/0373659 | A1* | 12/2019 | Brunson, IV | ......... H04W 48/18 |

* cited by examiner

Primary Examiner — Naomi J Small
(74) Attorney, Agent, or Firm — Kriegsman & Kriegsman

(57) ABSTRACT

An automatic meter reading (AMR) system includes a plurality of metering endpoints, each endpoint being configured to wirelessly transmit meter data in compliance with a data transmission schedule. A handheld unit, transported by a vehicle in proximity to the endpoints, is adapted to receive the meter data. To reduce the risk of communication collision, each endpoint is configured with techniques for modifying its transmission schedule. As one technique, each endpoint transmits meter data at a fixed time interval between successive transmissions, each transmission being applied with a random time offset to yield a non-periodic transmission cycle. As another technique, each metering endpoint is configured to transmit meter data within a designated time slot within the fixed time interval. Further, each endpoint monitors the distribution of data within the various time slots and modifies the time slot to which it is assigned to optimally balance the distribution of meter data.

10 Claims, 6 Drawing Sheets

AUTOMATIC METER READING SYSTEM

CROSS-REFERENCE TO RELATED APPLICATIONS

The present application claims the benefit under 35 U.S.C. 119(e) of U.S. Provisional Patent Application No. 62/880,139, which was filed on Jul. 30, 2019 in the name of Chang Shen, the disclosure of which is incorporated herein by reference.

FIELD OF THE INVENTION

The present invention relates generally to utility meters and, more particularly, to systems designed to automatically collect consumption data from utility meters.

BACKGROUND OF THE INVENTION

Metering devices, or meters, are commonly utilized by the utility industry to measure the consumption of energy, water, and the like. Modern utility meters compile digital consumption data which is then periodically collected by utility companies for billing purposes.

Originally, meter readings were obtained through manual periodic inspection of the meter. Using such information, consumption is often calculated using consumption estimation algorithms. As can be appreciated, estimating utility consumption is often inaccurate and, as such, is disfavored to the greatest extension possible.

Accordingly, digital utility meters are commonly coupled with wireless transmission means, such as a radio frequency (RF) transmitter, to form a smart meter, or metering endpoint. In this manner, a smart meter can be utilized as part of an automatic meter reading (AMR) system to wirelessly transmit meter data, such as consumption readings and operational status, to a handheld unit (HHU). In turn, the handheld unit can be used to transmit the data back to the utility company data center via conventional wireless communication networks, such as cellular networks. As such, AMR systems are relatively simple and easy to implement in comparison to advanced metering infrastructure (AMI) systems, since AMR systems do not require the expensive and complex construction of a designated network infrastructure. Additionally, by transmitting consumption data at fixed time intervals, AMR systems are able to compile consumption data in a more reliable and accurate fashion.

As part of the data collection process, the handheld unit is positioned in proximity to the metering endpoint. Each endpoint is programmed to transmit meter data at a specified frequency at fixed time intervals using a high data rate. By monitoring data transmitted within the specified channel, the handheld unit is able to receive and store all consumption data transmitted by metering endpoints within its immediate environment.

To streamline the data collection process, an automated meter reader is often transported in a moving vehicle. Accordingly, by driving through a residential neighborhood at a suitable velocity, consumption data from all nearby metering endpoints can be collected for subsequent processing and billing.

As referenced briefly above, metering endpoints are traditionally configured to periodically transmit meter data at time fixed intervals. The particular time interval selected for transmission of the data packets by each metering endpoint is selected for optimal efficiency. Notably, because the endpoint is normally powered by battery, the time interval between successive data transmissions must be sufficient enough to preserve battery life. However, at the same time, the duration between successive data transmissions cannot be too great so as to preclude collection by the handheld unit when in close relation relative thereto. Consequently, it has been found that a fixed data transmission interval of approximately 10-20 seconds provides the optimal balance between preserving battery life and ensuring proper data collection.

In sparsely populated areas, drive-by meter data collection processes of the type described above have been found to be largely effective. However, in densely populated areas, drive-by meter data collection processes have been found to suffer from a notable shortcoming.

Specifically, environments replete with a multitude of endpoints often transmit meter data in an undistributed fashion, thereby resulting in near, partial, and/or full data signal overlap. Due to this lack of synchronization in the transmission of meter data between the plurality of endpoints, communication collision often occurs. Because the overlapping meter data is incapable of separation, the data is effectively corrupted. Consequently, the handheld unit is unable to receive and process all necessary meter data, which is highly undesirable.

SUMMARY OF THE INVENTION

It is an object of the present invention to provide a new and improved automatic meter reading system.

It is another object of the present invention to provide a new and improved automatic meter reading system which efficiently and accurately collects meter data from a plurality of metering endpoints.

It is yet another object of the present invention to provide an automatic meter reading system as described above which is capable of collecting meter data from metering endpoints in both sparsely populated and densely populated environments.

It is still another object of the present invention to provide an automatic meter reading system as described above which is designed to minimize the occurrence of communication collision.

It is yet still another object of the present invention to provide an automatic meter reading system as described above which is both inexpensive to implement and efficient in its operation.

Accordingly, as one feature of the present invention, there is provided an automatic meter reading system, comprising (a) a plurality of metering endpoints, each of the plurality of metering endpoints being configured to transmit meter data in compliance with a data transmission schedule, the data transmission schedule comprising a sequence of wireless data transmissions of a fixed time interval between successive transmissions, and (b) a handheld unit in communication with each of the plurality of metering endpoints for receiving the meter data transmitted from the plurality of metering endpoints, (c) wherein at least one of the plurality of metering endpoints is adapted to adjust its data transmission schedule to optimize distribution of the meter data transmitted from the plurality of metering endpoints.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Automatic Meter Reading (AMR) System 11

Figure 1:
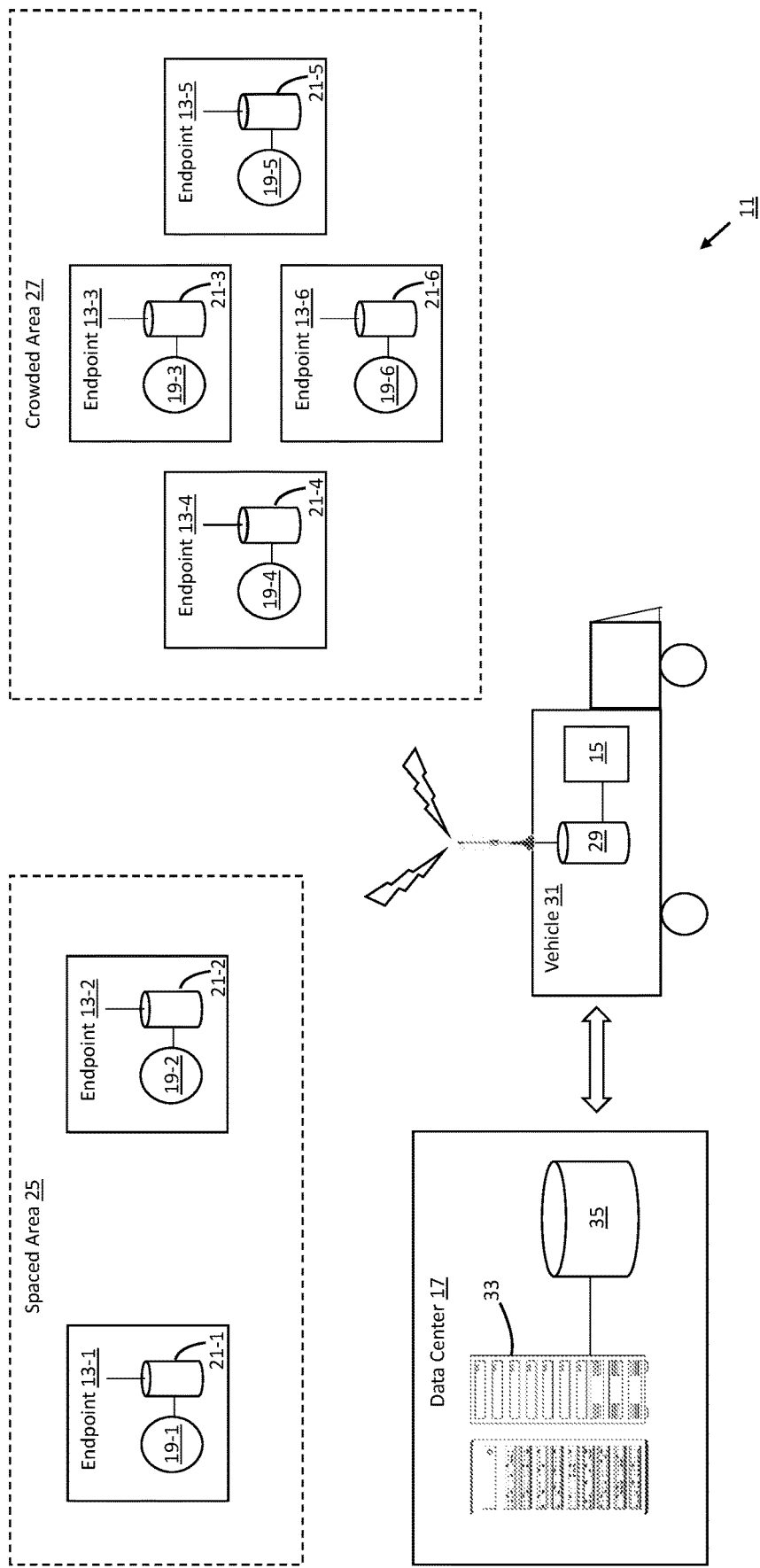
FIG. 1 is a simplified schematic representation of an automatic meter reading system constructed according to the teachings of the present invention.

Referring now to FIG. 1, there is shown a system for automatically reading data from a plurality of metering endpoints, the automatic meter reading (AMR) system being constructed according to the teachings of the present invention and identified generally by reference numeral 11. As will be explained in detail below, automatic meter reading system 11 is uniquely designed to collect meter data from metering endpoints in both sparsely populated and densely populated environments. Notably, AMR system 11 employs novel techniques for minimizing the risk of communication collision amongst the metering endpoints.

In the description that follows, system 11 is described primarily in connection with the automated reading of utility meters. However, it should be noted that system 11 is not limited to automated utility meter reading applications. Rather, it is to be understood that system 11 could be modified, as needed, for use in alternative applications which require data load balancing to reduce the frequency of communication collision.

As can be seen, AMR system 11 comprises (i) a plurality of metering endpoints 13-1 thru 13-6, each of which is designed to measure and collect consumption data, (ii) a handheld unit 15 for retrieving the consumption data from the plurality of endpoints 13, and (iii) a utility data center 17 in communication with handheld unit 15 for receiving, compiling and storing consumption data from handheld unit 15. In this manner, the collected consumption data can be utilized by a utility company for billing purposes.

Each metering endpoint 13 is shown comprising a digital utility meter 19 coupled with a wireless transmitter 21. Utility meter 19 represents any conventional digital meter utilized to measure utility consumption and, in turn, compile corresponding consumption data. Wireless transmitter 21 represents any wireless transmission device, such as a radio frequency (RF) transmitter, and is in direct communication with its associated utility meter 19. In this manner, consumption data compiled by utility meter 19 can be wirelessly sent from transmitted to handheld unit (HHU) 15.

For illustrative purposes, metering endpoints 13-1 and 13-2 are shown arranged within a sparsely populated, or spaced, area 25. Additionally, metering endpoints 13-3 thru 13-6 are shown arranged within a densely populated, or crowded, area 27. As a primary feature of the present invention, AMR system 11 is uniquely configured to accurately collect all meter data from metering endpoints 13 in both sparsely populated area 25 and densely populated area 27 with minimal incidents of communication collision.

Handheld unit 15 is a portable compute device which is designed to compile meter consumption data and, in turn, transmit such data to data center 17 via one or more existing communication networks, such cellular networks. In the present embodiment, handheld unit 15 is shown in direct communication with a radio frequency (RF) receiver 29, which is adapted to wirelessly receive meter data from endpoints 31. Additionally, handheld unit 15 and RF receiver 29 are shown housed within a vehicle 31. In this manner, drive-by, or mobile, data collection can be rapidly performed by simply driving vehicle 31 in proximity to areas 25 and 27, with handheld unit 15 preferably notifying the driver of vehicle 31 of the status of the data collection process (e.g., data collection complete, data collection incomplete, or data collection error).

Utility data center 17 represents a computer network configured to receive and store meter data (e.g., for billing purposes). In the present embodiment, data center 17 is shown comprising a network compute device, or server, 33 adapted to receive data from handheld unit 15. Additionally, a network database 35, either local or cloud-based, is shown in communication with server 33 for storing metering data.

As referenced briefly above, conventional AMR systems are designed to transmit meter data from metering endpoints at fixed time intervals. However, it has been found that the periodic transmission of meter data from endpoints located within a densely populated area can result in communication collision, which can corrupt the data.

Accordingly, as part of the present invention, AMR system 11 is adapted to be applied with one or more novel data transmission techniques to minimize the occurrence of communication collision. The details of each data transmission technique are explained in detail below.

Data Transmission at Randomized Intervals

As a first technique applied to AMR system 11 to minimize the occurrence of communication collision, a selection of metering endpoints 13 is configured to transmit meter data at randomized intervals. As a consequence, any recurrent data transmission overlap between multiple endpoints 13 is effectively prevented.

Figure 2:
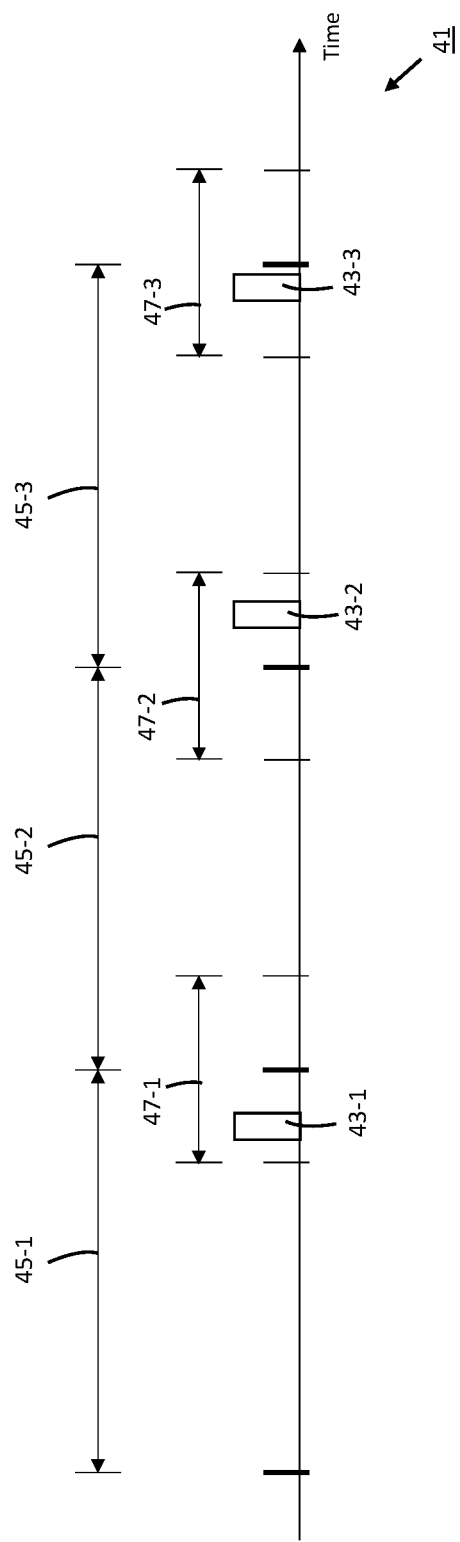
FIG. 2 is a sample data transmission timeline which is helpful in understanding a method of randomizing the schedule of data transmissions from at least one of the metering endpoints shown in FIG. 1.

Referring now to FIG. 2, there is shown a sample data transmission timeline 41 for a metering endpoint 13 which is helpful in understanding the randomized data transmission technique of the present invention. As can be seen, in the randomized data transmission technique of the present invention, data packets 43-1 thru 43-3 are transmitted at fixed time intervals 45-1 thru 45-3, respectively. However, each data transmission interval 45 is applied with a random offset in either direction relative thereto.

Preferably, the random offset applied in either direction to fixed time interval 45 is no greater than one-quarter of fixed time interval 45. As such, randomized interval ranges 47-1 thru 47-3, each of which is approximately one-half of fixed time interval 45, are established for the transmission of data packets 43-1 thru 43-3, respectively, with the end of each fixed time interval 45 located at the midpoint of its corresponding randomized interval range 47.

For example, if a metering endpoint 13 is configured to transmit meter data at a fixed time interval 45 of 15 seconds, a random offset of no greater than one-fifth of time interval 45 (i.e., 3 seconds) could be added or subtracted from the scheduled transmission time to create a randomized interval range 47 of 6 seconds. As such, each data packet transmission would occur between 12 seconds and 18 seconds from the start of fixed time interval 45. A sample data transmission schedule under the aforementioned parameters starting at time 12:00:00 may therefore be in the form of 12:00:14.2, 12:00:31.0, 12:00:48.1, 12:00:57.5, 12:01:02.8, 12:01:16.9, etc.

Accordingly, in the example shown in FIG. 2, data packet 43-1 is applied with a negative offset which schedules transmission towards the beginning of random interval range 47-1, data packet 43-2 is applied with a positive offset which schedules transmission towards the end of random interval range 47-2, and data packet 43-3 is applied with a limited negative offset which schedules transmission just prior to the scheduled end of fixed time interval 45-3.

The application of a randomized offset to the fixed transmission schedule assigned to an endpoint 13 ensures that, if transmission data from the endpoint 13 is corrupted to due communication collision, the randomized adjustment applied to subsequent transmissions will reduce the likelihood of further communication collision. In this manner, all necessary data transmitted from endpoints 13 can ultimately be collected by handheld unit 15 without corruption.

Data Transmission using Designated Time Slots

As a second technique applied to AMR system 11 to minimize the occurrence of communication collision, a selection of metering endpoints 13 is assigned a predefined time slot within each fixed time interval for data packet transmission. By balancing the distribution of data transmissions within each fixed time interval, transmission overlap between multiple endpoints 13 is effectively prevented.

Figure 3:
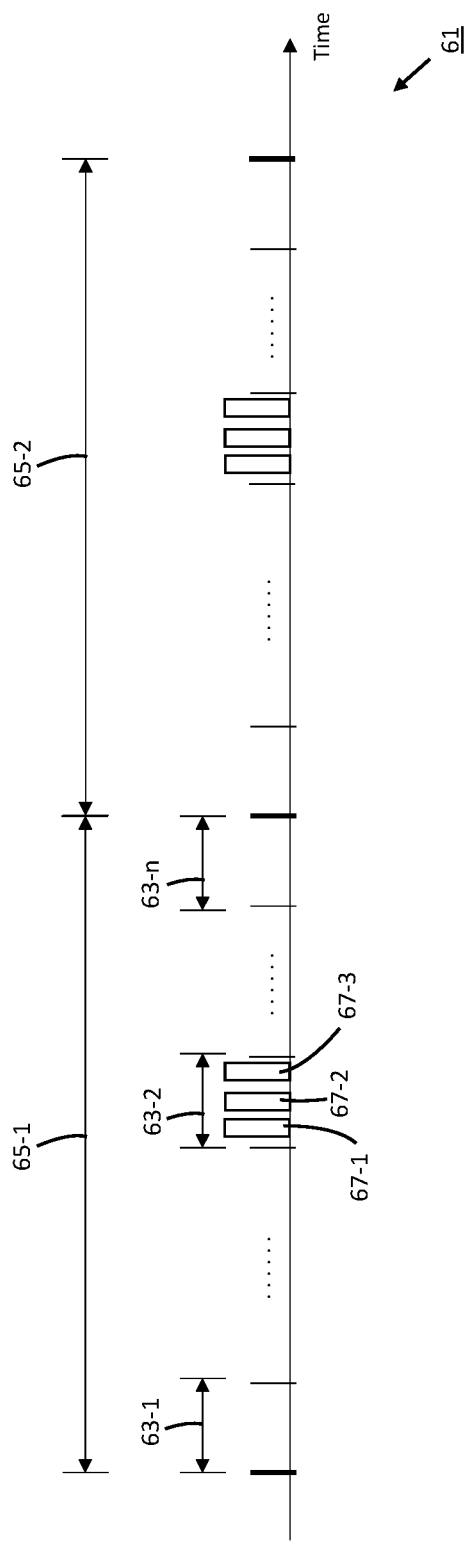
FIG. 3 is sample data transmission time which is helpful in understanding a method of assigning data transmission time slots to a selection of the metering endpoints shown in FIG. 1.

Referring now to FIG. 3, there is shown a sample data transmission timeline 61 for multiple metering endpoints 13 which is helpful in understanding the time slot designation technique of the present invention. As can be seen, in the time slot designation technique of the present invention, a plurality of distinct time slots 63-1 thru **63-*n* is defined within each of fixed time intervals 65-1 and 65-2. The particular number of time slots 63, and spacing therebetween, within each time interval 65** can be configured based on the particular application of use.

Each endpoint 13 is then randomly assigned to a particular time slot 63 (e.g., upon initiation of service). Based on probability statistics, approximately the same number of metering endpoints 13 will be assigned to each time slot 63. As such, data transmission will be evenly distributed, thereby minimizing the likelihood of communication collision.

In the example shown in FIG. 3, three endpoints 13 are assigned time slot 63-2 for meter data transmission. Accordingly, data packets 67-1, 67-2, and 67-3 represent the meter data sent from the three aforementioned endpoints 13.

To prevent overlap of data packets 67-1 thru 67-3 within time slot 63-2, each endpoint 13 may be assigned a unique transmission time within time slot 63-2. Alternatively, each endpoint 13 assigned to time slot 63-2 may be applied with a random offset, or variation, of the type explained in detail above in connection with timeline 41 in FIG. 2. To ensure that each data packet 67 remains within time slot 63-2, it is to be understood that any randomized offset would be no greater than half the period of each time slot 63.

If the random assignment of endpoints 13 to transmission time slots 63 results in an uneven distribution of data transmissions, an automated data load balancing process may be applied to create a more even distribution of data transmission, the details of one such auto-balancing technique being set forth in detail below.

Data Transmission with Automated Data Load Balancing

As a third technique applied to AMR system 11 to minimize the occurrence of communication collision, automated data load balancing may be applied to each of metering endpoints 13 to compensate for the undistributed, or unbalanced, transmission of metering data which may otherwise result in communication collision.

Figure 4:
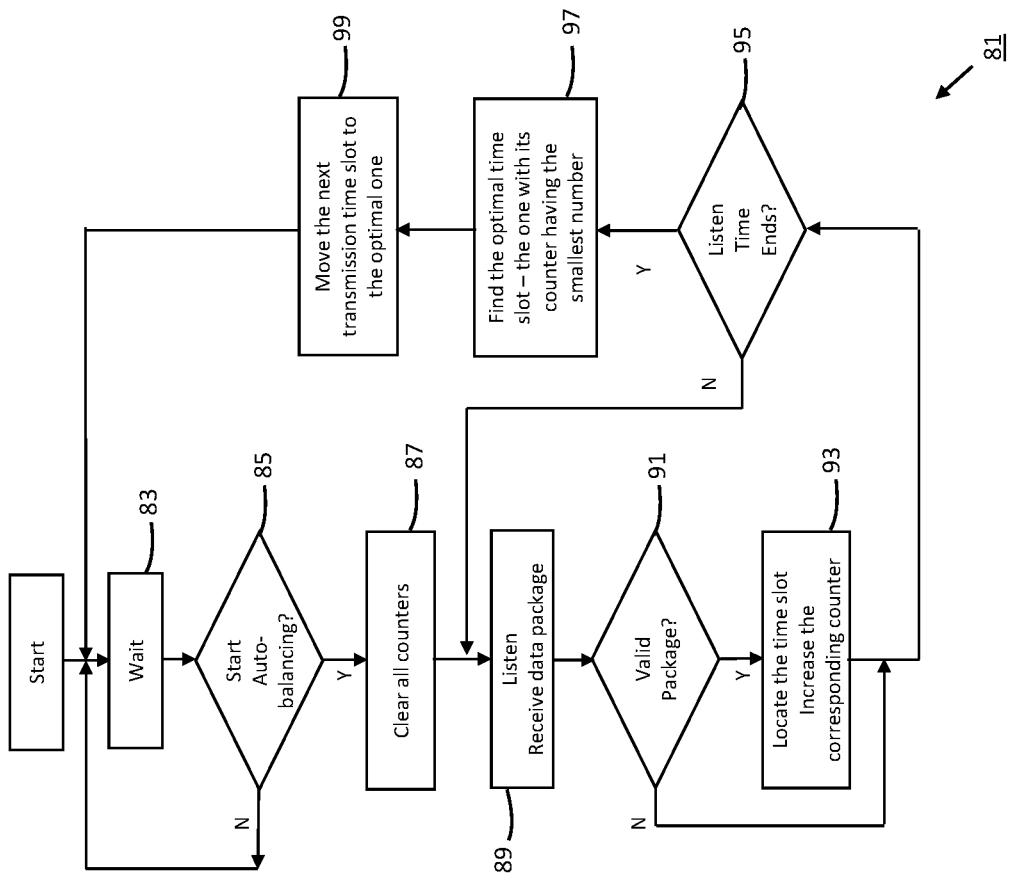
FIG. 4 is a flow chart depicting a method of auto-balancing data loads transmitted from a selection of the metering endpoints shown in FIG. 1.

Referring now to FIG. 4, there is shown a flow chart which depicts the automated data load balancing process of the present invention, the load balancing process being identified generally by reference numeral 81. For simplicity purposes, load balancing process 81 is explained with respect to a single metering endpoint 13. However, it is to be understood that load balancing process 81 is preferably applied to all endpoints 13 within a designated environment to achieve optimal data load distribution.

Each metering endpoint 13 is assigned a unique date and time for recurrent execution of auto-balancing process 81. To minimize the risk of overlap, the date and time of the auto-balancing process assigned to each endpoint 13 is preferably spaced adequately apart from the date and time assigned to the remaining endpoints 13 to compensate for potential drifting of the internal clock within endpoint 13.

For instance, a first endpoint (e.g., endpoint 13-1) may be scheduled for auto-balancing at 1 am on the 10th day of each month. A second endpoint (e.g., endpoint 13-2) may be scheduled for auto-balancing at 7 am on the 10th day of each month, and the scheduling continues in a similar fashion until all endpoints 13 are assigned a unique auto-balancing day and time.

As can be seen, upon commencement of process 81, a waiting step 83 is undertaken by endpoint 13 until its scheduled time for auto-balancing is reached. Once it is determined in step 85 that auto-balancing is to start, a counter designated for each time slot within each fixed time interval is created and cleared, as part of step 87. As will be explained in detail below, each counter is utilized to count the number of endpoints 13 that transmit data within its corresponding time slot.

Thereafter, in step 89, endpoint 13 listens to all wireless traffic within the designated channel. As soon as endpoint 13 receives a data package, endpoint 13 inspects the data package to determine whether it is valid metering data, as represented in step 91. As can be appreciated, data may be transmitted within the designated channel that does not represent meter consumption data and, as such, can be disregarded in connection with auto-balancing process 81.

If endpoint 13 determines the data package to be valid, endpoint 13 records the receiving time for the data package and, in turn, increases the counter for the corresponding time slot, as represented by step 93. If endpoint 13 determines the data package to be invalid, step 93 is bypassed and process 13 advances to step 95.

In step 95, endpoint 13 determines whether the designated listening time has completed. As can be appreciated, the listening time is preferably at least as long as one data transmission time interval to ensure that at least one data package is received from each endpoint 13 in the environment. To ensure optimal reliability, endpoint 13 preferably listens to multiple data transmission time intervals (i.e. in case a data packet is missed, corrupted, or the like).

If the designated listening time has not completed, auto-balancing process 81 returns to listening step 89 and additional data packets are collected and analyzed. However, if endpoint 13 determines that the designated listening time has completed, endpoint 13 engages in a data distribution analysis step 97. As part of step 97, endpoint 13 locates the time slot counter with the lowest count, thereby indicating the time slot with the least amount of data traffic.

Upon determining the time slot with the least amount of data traffic (i.e., the optimal time slot), endpoint 13 modifies its own transmission schedule by scheduling future meter data transmissions within the optimal time slot, as represented by step 99. Upon completion, process 81 returns to step 83, and endpoint 13 waits for its next scheduled auto-balancing task. Accordingly, with all endpoints 13 within a designated area routinely engaging in auto-balancing process 81, a more even distribution of data transmission is achieved and maintained, thereby reducing the likelihood of communication collision.

Figure 5B:
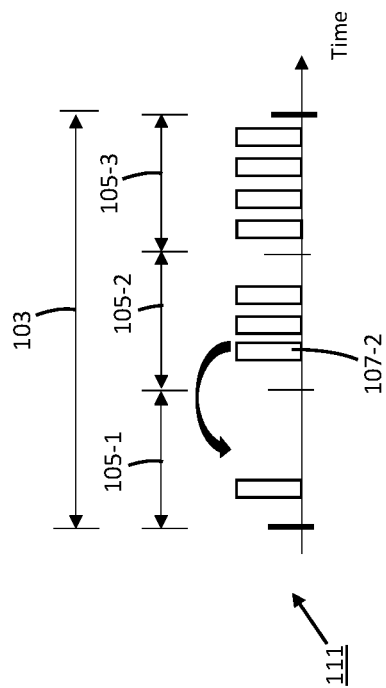
FIGS. 5(a)-(e) are a series of sample data transmission timelines which are helpful in understanding the automated data load balancing method shown in FIG. 4.
Figure 5A:
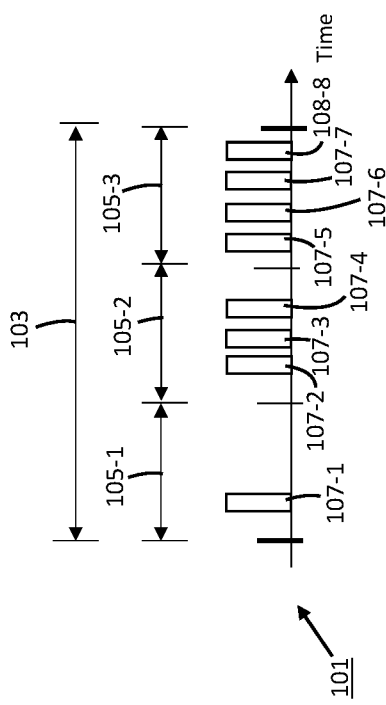
Figure 5E:
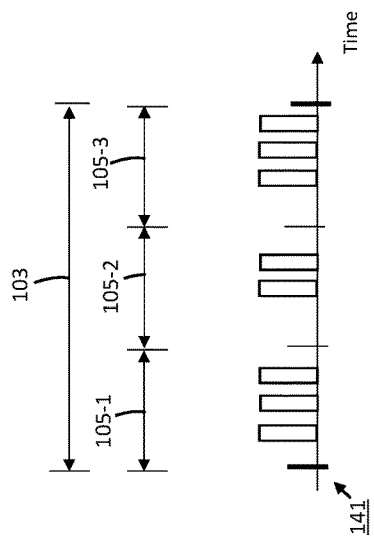

Referring now to FIGS. 5(a)-(e), a series of sample data transmission timelines for a set of commonly-located metering endpoints 13 is provided to facilitate understanding of load balancing process 81. In FIG. 5(a), a natural, or untreated, timeline 101 for eight metering endpoints 13 located within the same general area is provided. As can be seen, sample timeline 101 has a fixed transmission time interval 103 with three designated time slots 105-1 thru 105-3. In the present example, a single data packet 107-1 is transmitted from a corresponding endpoint 13 in time slot 105-1, three data packets 107-2 thru 107-4 are transmitted from corresponding endpoints 13 in time slot 105-2, and four data packets 107-5 thru 107-8 are transmitted from corresponding endpoints 13 in time slot 105-3.

As can be appreciated, the transmission of data packets in timeline 101 is unevenly distributed, thereby increasing the risk of communication collision. Accordingly, each endpoint 13 engages in auto-balancing process 81 at its scheduled day and time to more evenly distribute data packets 107-1 within time interval 103.

For example, when the endpoint 13 responsible for the transmission of data packet 107-1 engages in auto-balancing process 81, it will determine that time slot 105-1 is the most optimal time slot for data transmission and, as such, will retain its transmission schedule within time slot 105-1.

As seen in timeline 111 in FIG. 5(b), when the endpoint 13 responsible for the transmission of data packet 107-2 engages in auto-balancing process 81, it will determine that time slot 105-1 is the most optimal time slot for data transmission. As a result, the endpoint 13 will move its transmission schedule from time slot 105-2 to time slot 105-1, thereby resulting in a timeline 121 shown in FIG. 5(c).

When the endpoints 13 responsible for the transmission of data packets 107-3 and 107-4 then engage in auto-balancing process 81, each will determine that time slot 105-2 is one of the most optimal time slots for data transmission and, as such, will retain its transmission schedule within time slot 105-2.

Figure 5D:
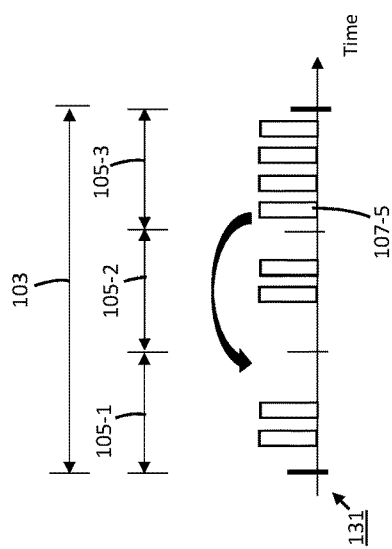
Figure 5C:
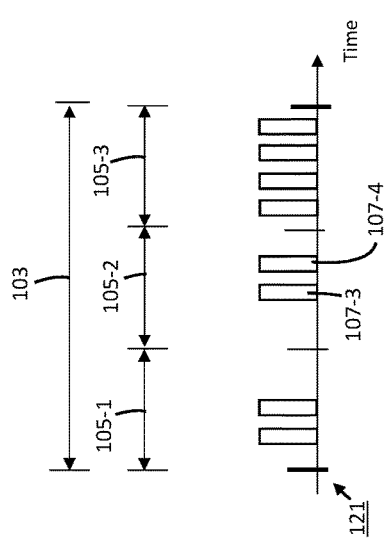

As seen in timeline 131 in FIG. 5(d), when the endpoint 13 responsible for the transmission of data packet 107-5 engages in auto-balancing process 81, it will determine that time slot 105-1 is the most optimal time slot for data transmission. As a result, the endpoint 13 will move its transmission schedule from time slot 105-3 to time slot 105-1, thereby resulting in timeline 141 shown in FIG. 5(e). As can be seen, timeline 141 represents the most optimal distribution of data within fixed time interval 103. Therefore, through the repeated, scheduled engagement of auto-balance process 81 by each endpoint 13, optimal distribution of data can be maintained.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An automatic meter reading system, comprising:
   (a) a plurality of metering endpoints, each of the plurality of metering endpoints being configured to transmit meter data in compliance with a data transmission schedule, the data transmission schedule comprising a sequence of wireless data transmissions of a fixed time interval between successive transmissions, the fixed time interval being defined with a plurality of separate time slots, each of the metering endpoints being configured to transmit meter data in data packets within one of the plurality of time slots; and
   (b) a handheld unit in communication with each of the plurality of metering endpoints for receiving the meter data transmitted from the plurality of metering endpoints;
   (c) wherein each of the metering endpoints is configured to receive all data packets transmitted by the plurality of metering devices for a defined period of time and to determine whether each of the received data packets contains valid metering data, each of the metering endpoints being configured to count the number of data packets containing valid metering data that is transmitted during each time slot in the fixed time interval;
   (d) wherein at least one of the plurality of metering endpoints is adapted to adjust its data transmission schedule to optimize distribution of the meter data transmitted from the plurality of metering endpoints.

2. The automatic meter reading system as claimed in claim 1 further comprising a data center in communication with the handheld unit for storing the meter data received by the handheld unit.

3. The automatic meter reading system as claimed in claim 1 wherein at least one of the plurality of metering endpoints is configured to apply a randomized offset to the fixed time interval for each wireless data transmission in its transmission schedule.

4. The automatic meter reading system as claimed in claim 3 wherein the randomized offset is unique for each wireless data transmission in its transmission schedule.

5. The automatic meter reading system as claimed in claim 4 wherein the randomized offset is no greater than one-quarter of the fixed time interval.

6. The automatic meter reading system as claimed in claim 5 wherein the randomized offset is one of positive and negative.

7. The automatic meter reading system as claimed in claim 1 wherein each of the metering endpoints is configured to transmit meter data within one time slot which is randomly selected.

8. The automatic meter reading system as claimed in claim 1 wherein each of the metering endpoints is configured to receive all data packets transmitted by the plurality of metering devices on a recurrent day and time that is unique for the metering endpoint.

9. The automatic meter reading system as claimed in claim 1 wherein each of the metering endpoints is configured to modify the time slot to which it is assigned for the transmission of meter data based on the distribution of meter data transmitted amongst each of the plurality of time slots.

10. The automatic meter reading system as claimed in claim 9 wherein each of the metering endpoints is configured to switch from the time slot to which it is assigned for the transmission of meter data to the time slot with the fewest number of counted data packets containing valid metering data.

\* \* \* \* \*